US009010811B2

(12) United States Patent
Gramling et al.

(10) Patent No.: US 9,010,811 B2
(45) Date of Patent: Apr. 21, 2015

(54) BOTTOM DROP TEE WITH DOOR CATCH

(71) Applicant: Delaware Capital Formation, Inc., Wilmington, DE (US)

(72) Inventors: Steven D. Gramling, Olathe, KS (US); Jeffrey J. Blair, Kansas City, MO (US)

(73) Assignee: Delaware Capital Formation, Inc., Wilmington, DE (US)

( * ) Notice: Subject to any disclaimer, the term of this patent is extended or adjusted under 35 U.S.C. 154(b) by 48 days.

(21) Appl. No.: 14/057,631

(22) Filed: Oct. 18, 2013

(65) Prior Publication Data

US 2014/0110932 A1 Apr. 24, 2014

Related U.S. Application Data

(60) Provisional application No. 61/716,510, filed on Oct. 20, 2012.

(51) Int. Cl.
*F16L 39/00* (2006.01)
*F16L 41/02* (2006.01)
*B65D 90/62* (2006.01)
*F16L 45/00* (2006.01)

(52) U.S. Cl.
CPC ............ *F16L 41/021* (2013.01); *B65D 90/623* (2013.01); *F16L 45/00* (2013.01)

(58) Field of Classification Search
CPC ................................ F16L 41/021; F16L 45/00
USPC .................... 285/126.1, 133.11–133.6, 179.1; 406/127, 144; 292/256, 256.5, 1, 80, 292/137, 138, 247; 16/348, 357, 361, 374, 16/231, 232, 334
See application file for complete search history.

(56) References Cited

U.S. PATENT DOCUMENTS

| 1,564,611 | A | * | 12/1925 | Mountford et al. ............. 16/322 |
| 3,110,357 | A | * | 11/1963 | Jenn et al. ..................... 181/224 |
| 3,531,823 | A | * | 10/1970 | Cornelius ........................ 16/361 |
| 7,988,386 | B2 | * | 8/2011 | Sisk ............................... 406/127 |
| 8,091,925 | B2 | | 1/2012 | Sisk |
| 2006/0082138 | A1 | | 4/2006 | Kraenzle |
| 2009/0212555 | A1 | * | 8/2009 | Sisk .......................... 285/133.11 |
| 2013/0168956 | A1 | | 7/2013 | Sisk |

* cited by examiner

*Primary Examiner* — Michael P Ferguson
*Assistant Examiner* — Jay R Ripley
(74) *Attorney, Agent, or Firm* — Spencer Fane Britt & Browne LLP

(57) ABSTRACT

A catch for securing a door to an object includes an engagement member connected to the door engaging a receiving member of a mount on the object. The door includes a first arm with an oblong hole for pivoting about a pin connected to the mount, and an engagement pin. Moving the door from a closed position causes the engagement pin to rotate with the door about the pivot pin. The door slides downward along the pivot pin as the pivot pin travels within the oblong opening, and the engagement pin makes contact with the receiving member, thereby retaining the door in an open position. Moving the door upward moves the pivot pin downward within the oblong opening disengaging the engagement pin from the receiving member, allowing the door to rotate to a closed position. A latch opposite the first arm retains the door in a closed position.

11 Claims, 11 Drawing Sheets

BOTTOM DROP TEE WITH DOOR CATCH

CROSS-REFERENCE TO RELATED APPLICATIONS

This is a non-provisional patent application which claims the benefit of Provisional Application No. 61/716,510, filed Oct. 20, 2012, the contents of which are hereby incorporated by reference.

BACKGROUND

The present disclosed subject matter relates generally to a mechanism for securing a structure to an object, and in particular a bottom drop tee with a door catch.

Hopper tees are used to transfer material from containers, including bulk material tank trailers. The hopper tee includes a vertical passage that intersects a horizontal passage, generally forming an inverted T-shape. The vertical portion connects to the bottom of the container, and the ends of the horizontal portion are connected to an adjacent hopper tee by a conduit, or to an output conduit for off-loading the material from the container. A bottom drop hopper tee further includes an opening in the bottom wall of the horizontal passage sealed by a movable door. The bottom opening in the tee allows material to exit the container from below the tee, or for an operator to clean or inspect the interior of the hopper tee.

Conventional doors on bottom drop hopper tees are moved between a sealed and an unsealed position by manipulation of a complex series of mechanical levers, latches, and biasing members. Further, the conventional doors rely on biasing members, latches, and removable pins to secure the door in the open position out of the stream of material falling from the container above.

Heretofore there has not been available a mechanism for securing a structure to an object, in particular, bottom drop hopper tee assembly with the advantages and features of the disclosed subject matter.

SUMMARY

A mechanism for securing a structure, such as a door, to an object, such as a hopper tee, includes an engagement member connected to the structure that engages a first mount connected to the object. The first mount includes an arm having a top edge, an opposite bottom edge, and sidewalls therebetween, wherein the arm defines a hole between the sidewalls. A receiving member is disposed adjacent the hole at the top edge of the arm. The engagement member includes a first arm defining an oblong hole with sidewalls therethrough, the oblong hole having a first width and an elongated second width. A pin connected to the first arm engages the receiving member. A pivot pin admitted within the mount arm hole and the engagement member first arm hole allows the engagement member to rotate about the pivot pin. In particular, the pivot pin moves between the sidewalls along the length of the second width when the pin is aligned to engage the receiving member.

The hopper tee allows for the transfer of material from a container to another container or tee, and includes a vertical tubular portion extending between an upper end having an upper opening, and a lower end having a lower opening. The vertical portion defines a vertical passage for transferring material from a container, connected to the upper opening, through the tee. The hopper tee further includes a horizontal tubular portion that intersects the vertical tubular portion, and extends between a first end having a first opening, and a second end having a second opening. The horizontal tubular portion includes a wall extending between an inner surface and an outer surface defining a horizontal passage. A bottom opening extending through the bottom of the horizontal tubular portion wall allows for material to pass directly from the container to an area below the tee, or allows material to pass directly from the tee to an area below the tee. The door seals the bottom opening to retain material within the tee.

A mechanism for securing the door to the horizontal tubular portion includes a latch assembly connected to the door that engages a second mount connected to the horizontal tubular portion opposite the first mount. The second mount includes an arm having a top edge, an opposite bottom edge, and sidewalls therebetween, wherein the arm defines a hole between the sidewalls. A receiving member is disposed adjacent the hole at the top edge of the arm. A second arm defining a hole extends from the door for rotatably mounting the latch assembly to the door by a pin. The latch assembly includes a latch having a body, a pair of adjacent arms extending away from the body, with each arm defining an upper hole and an adjacent lower hole. A mount extending away from the body opposite the arms defines a hole at a distal end. The latch body is rotatably mounted about the door second arm by the pin received within the upper hole and the second mount arm hole. A clasp is connected to a latch pin rotatably received within the lower hole and is adapted for engaging the receiving member of the second mount.

When an operator desires to transfer material from the container through the hopper tee to a location below the hopper tee, the door assembly is transitioned from the closed position to the open position. The door is retained in the open position by the catch assembly.

The door is transitioned from a closed position to an open position by first disengaging the latch assembly from the second mount. As the door rotates downward and away from the bottom of the horizontal portion it unseals the bottom opening and pivots about the pivot pin. The engagement pin rotates with the door assembly around the pivot pin until the door slides downward along the pivot pin due to the travel of the pivot pin within the oblong opening causing the engagement pin to make contact with the receiving member of the first mount. When the engagement pin seats against the receiving member, the door remains in the open position allowing material to be discharged from the container above the tee, or the tee, through the bottom opening.

The door is transitioned from the open position to the closed position by moving the door upward so that the door slides upward along the pivot pin disengaging the engagement pin from the receiving member, thereby allowing the door to rotate upward and toward the bottom of the horizontal portion for sealing the bottom opening.

BRIEF DESCRIPTION OF THE DRAWINGS

The drawings constitute a part of this specification and include exemplary embodiments of the disclosed subject matter, and illustrate various objects and features thereof.

DETAILED DESCRIPTION

Figure 1:
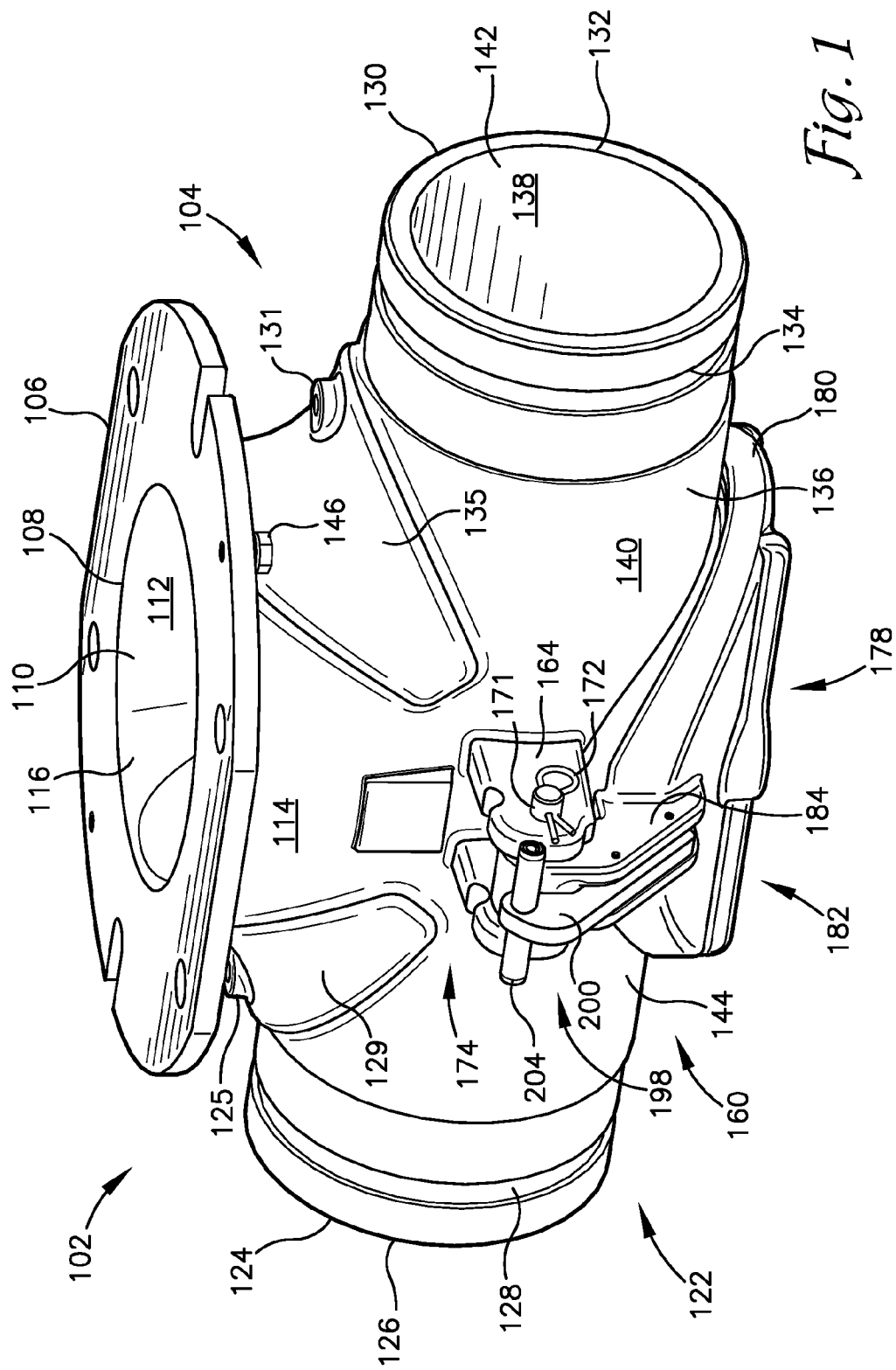
FIG. 1 is a perspective view of a hopper tee with a catch assembly embodying principles of the disclosed subject matter.

Detailed aspects of the disclosed subject matter are described herein; however, it is to be understood that the disclosed aspects are merely exemplary of the disclosed subject matter, which may be embodied in various forms. Therefore, specific structural and functional details disclosed herein are not to be interpreted as limiting, but merely as a basis for the claims and as a representative basis for teaching one skilled in the art how to variously employ the disclosed technology in virtually any appropriately detailed structure.

Certain terminology will be used in the following description for convenience in reference only and will not be limiting. For example, up, down, front, back, left, and right refer to the invention as orientated in the view being referred to. The words "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof, and words of similar meaning.

Referring to the drawings, a mechanism for securing a structure to an object is shown and described, in particular a hopper tee 102 including a catch assembly 160 embodying principles of the disclosed subject matter is shown and described for retaining a door assembly 178 of a hopper tee 102 in an open position. The hopper tee 102 is used to transfer material from a container to another container or tee. The hopper tee 102 and its various components are manufactured from metal including steel, aluminum, and alloys thereof. The material passing through the tee 104 includes solids and liquids.

Figure 2:
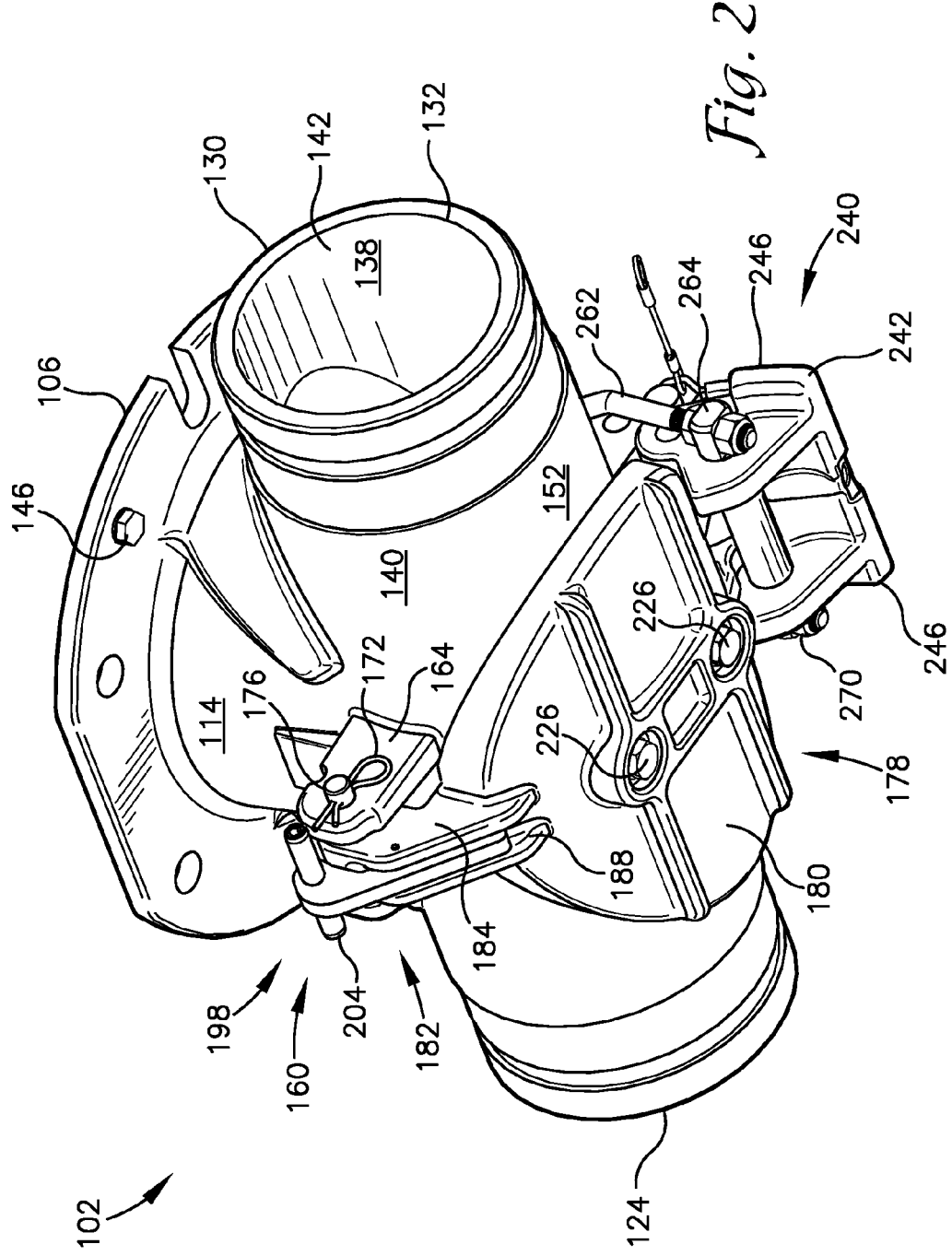
FIG. 2 is a perspective view from below of the catch assembly in a disengaged position, and the door in a closed position.
Figure 3:
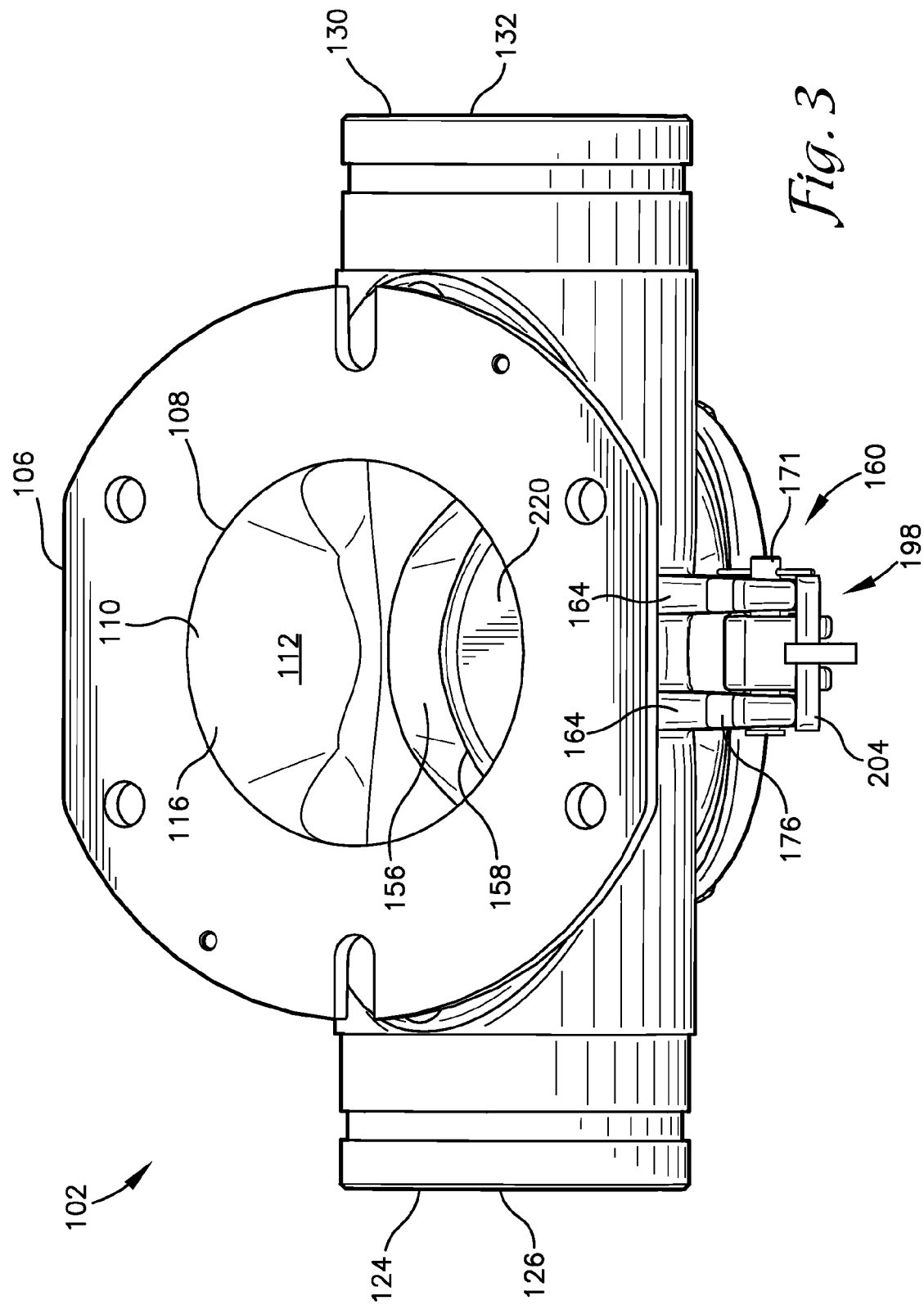
FIG. 3 is a plan view of the catch assembly.
Figure 4:
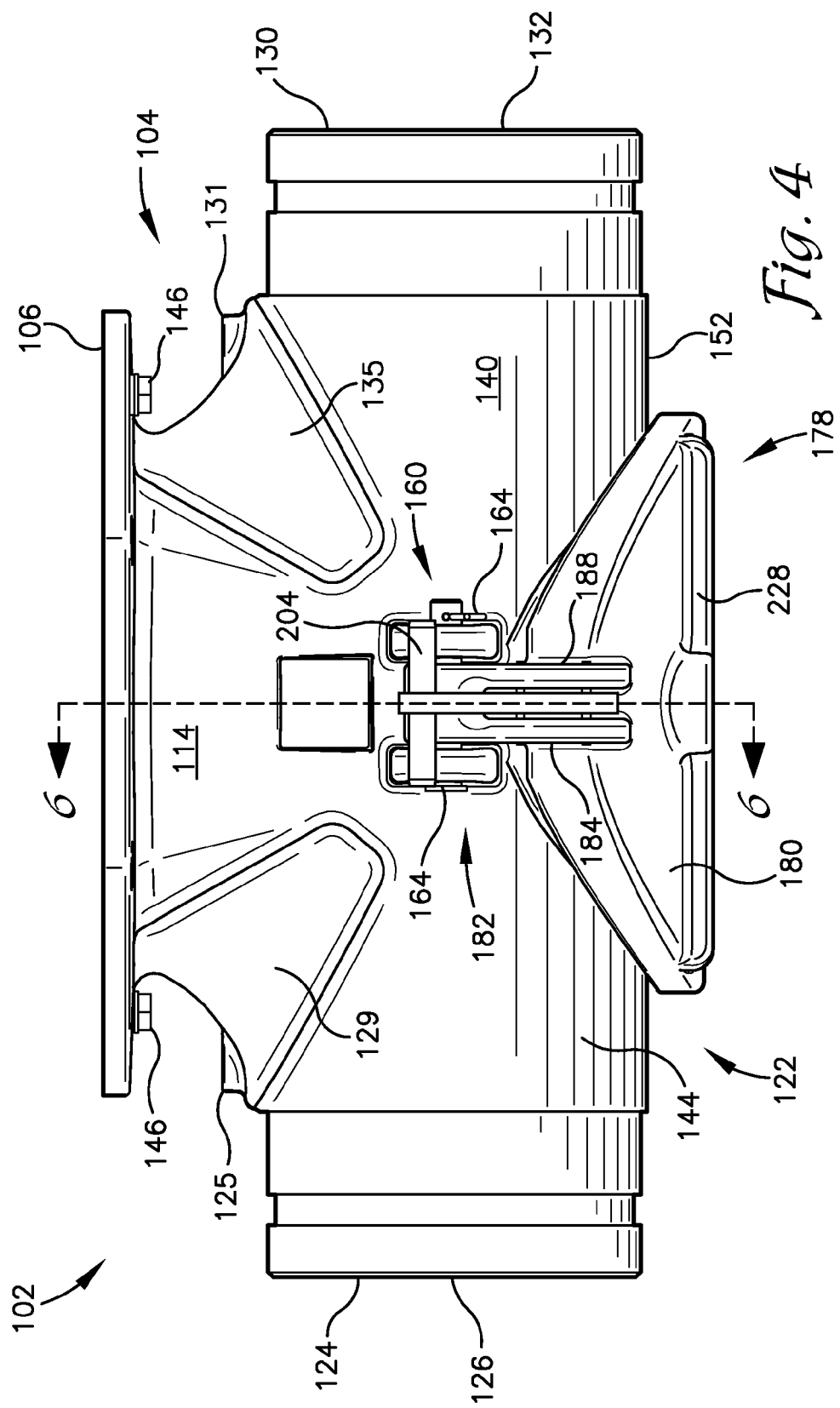
FIG. 4 is a side elevation view of the catch assembly.

Referring to FIGS. 1-2, the hopper tee 102 includes a horizontal portion 122 that intersects a vertical portion 104, generally having an inverted T-shape. The horizontal portion 122 is an elongated tubular member extending between a first end 124 and a second end 130, having a wall 136 extending between an inner surface 138 and an outer surface 140, defining a horizontal passage 142. Each of the first end 124 and second end 130 include an opening 126 and 132, each adapted for connecting the hopper tee 102 to another conduit, including an elongated tubular conduit, or a container. Slots 128 and 134 permit attachment 140 of a clamp or coupler for connecting the hopper tee 102 to another conduit. In an embodiment, the horizontal portion 122 and vertical portion 104 have a closed curve cross section. A generally elliptical bottom opening 158 extends through the wall 136 in the bottom 152 of the horizontal portion 122 and is dimensioned to correspond to the conformation of the inlet 108 in the vertical portion 104 when viewed from above or below the hopper tee 102. A lip 156 extends downward from the bottom opening 158 and presents a bead 154 for a gasket 280 of the door assembly 178 to seat against.

The vertical portion 104 is a tubular member extending between a lower portion defining a lower opening at the horizontal portion 122, and an upper portion defining an upper opening at an inlet 108. The vertical portion 104 includes a wall 110 extending between an inner surface 112 and an outer surface 114, defining a vertical passage 116. The inlet 108 includes a flange 106 extending from the upper end for mounting the hopper tee 102 below a container including a bulk material tank trailer. The flange 106 has apertures extending therethrough allowing the hopper tee 102 to be mounted below the container with fasteners, including threaded fasteners such as screws. The lower opening allows the transfer of material from the vertical portion 104 to the horizontal portion 122.

In an embodiment the hopper tee 102 includes wear ports 125, 131 on first and second radiuses 129 and 135 respectively. Each wear port 125, 131 forms an upwardly-open cavity disposed at a depth between the inner 138 and the outer surface 140 and have a sacrificial wall extending between the bottom of the wear port 125, 131 and the inner surface 138. When using the hopper tee 102 with abrasive material, the radius may become worn from the inner surface 138 toward the outer surface 140 causing a weakness in the wall 136 necessitating repair or rotation of the hopper tee 102. A plug 146 threadably received in the flange 106 is used to seal the ports 125, 131 when the inner surface 138 is worn such the sacrificial wall at the bottom of the ports 125, 131 is worn through thereby indicating a need to rotate the hopper tee 102 to avoid failure of the tee wall. Securing the threaded plug 146 within the threaded ports 125, 131 allows the hopper tee 102 to be used until it can be replaced.

Figure 5:
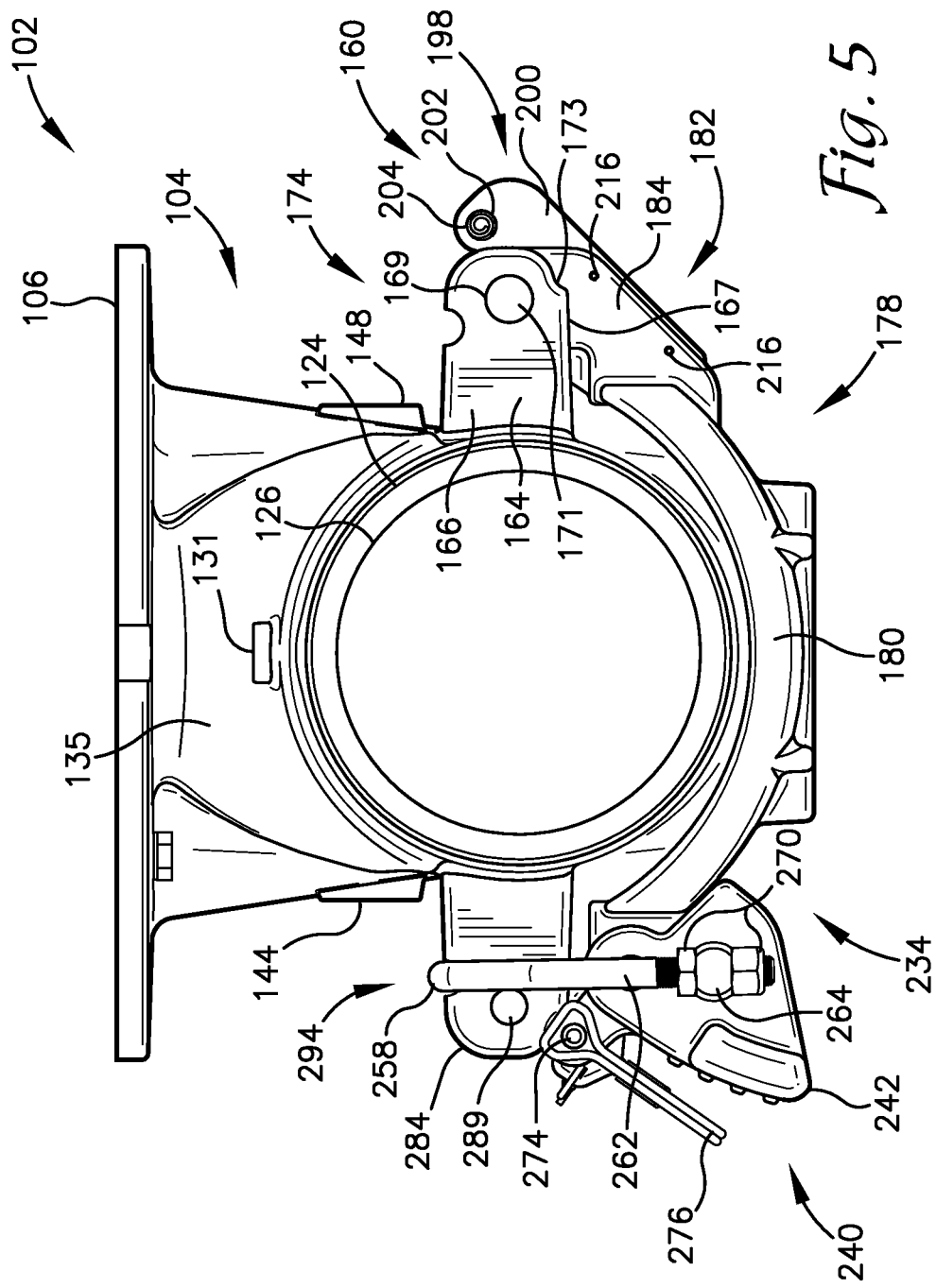
FIG. 5 is an end elevation view of the catch assembly.
Figure 6:
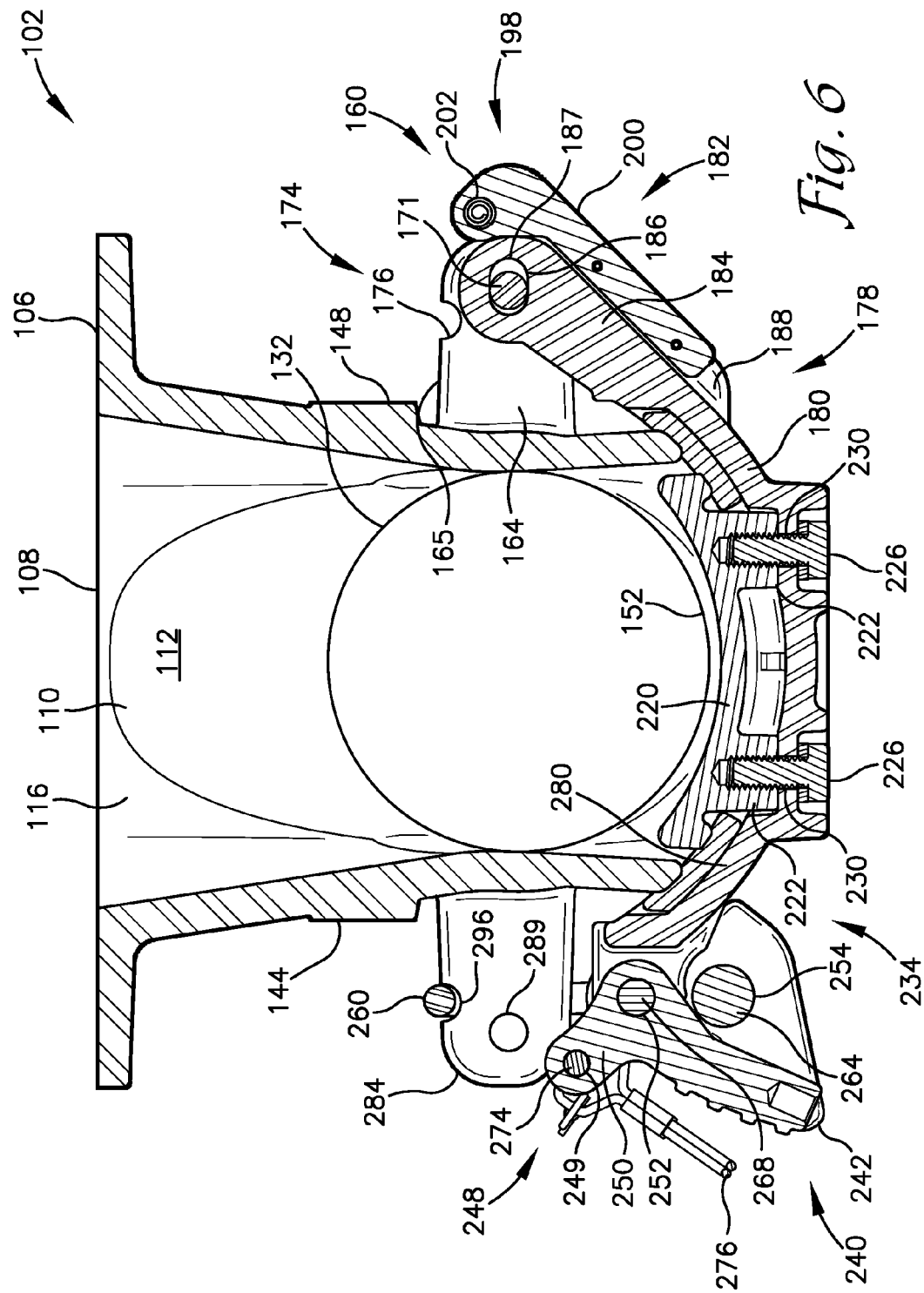
FIG. 6 is a cross-sectional view of the catch assembly taken along the line 6-6 in FIG. 4.
Figure 7:
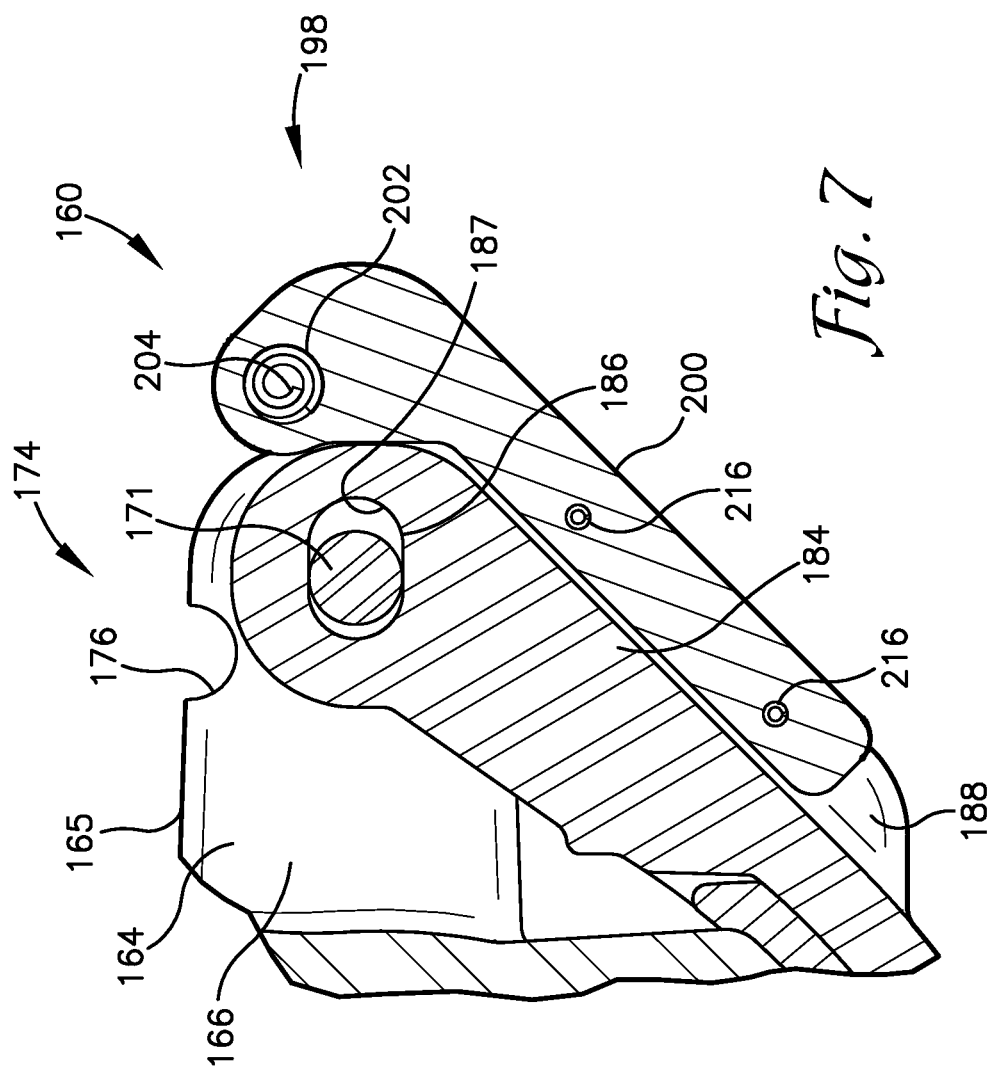
FIG. 7 is an enlarged cross-sectional view of the catch assembly as shown in FIG. 6.
Figure 8:
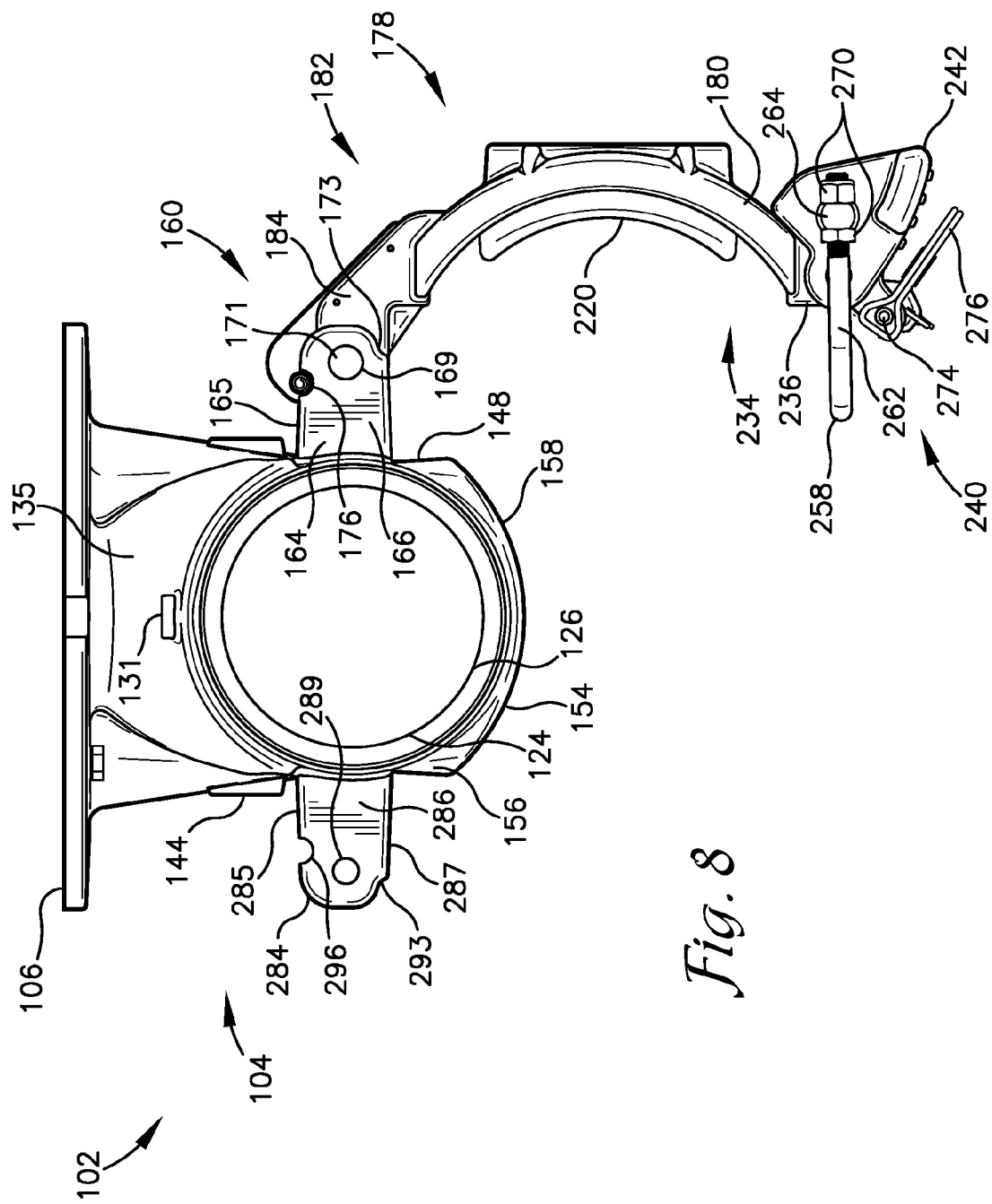
FIG. 8 is an end elevation view of the catch assembly in an engaged position retaining the door in an open position.

When the door assembly 178 is in a closed position during use, as shown in FIGS. 1-2, as material descends from the container above the hopper tee 102 the material exits the hopper tee 102 through one of the ends 124, 130 in the horizontal portion 122. When an operator desires to transfer material from the container through the hopper tee 102 to a location below the hopper tee 102, the door assembly 178 is transitioned from the closed position (FIG. 5) to the open position (FIG. 8). The door assembly 178 is retained in the open position by the catch assembly 160.

One end of the door assembly 178 is pivotally connected to the horizontal portion 122 by a mount comprising a pair of first arms 164, and the opposite end of the door assembly 178 is releasably connected to the horizontal portion 122 by a mount comprising a pair of second arms 284. The door assembly 178 extends transversely across the bottom of the horizontal portion 122, and has a curved body 180 conforming generally to the curvature of the horizontal portion 122. The first arms 164 and second arms 284 are disposed opposite each other on either side of the horizontal portion 122 and allow the door assembly 178 to be positioned with the catch assembly 160 engaging either the first arms 164 or the second arms 284.

The first arms 164 extend outwardly from the first side 144 of the horizontal portion 122 beginning at a proximal end and terminating at a distal end, wherein each arm 164 defines a hole 169, a receiving member 174, and a seat 173. The hole 169 extends between the sides 166 of the arm 164 and is located adjacent the distal end of the arm 164. The receiving member 174 is disposed on the top 165 of the arm 164 and includes a depression 176 to accommodate the pin 204 of the engagement member 198, discussed in more detail below. Alternatively, the receiving member 174 may be a protrusion extending from the top 165 of the arm 164. The seat 173 is disposed on the bottom 167 distal end of the arm 164 to accommodate the lock pin 274, discussed in more detail below. The first arms 164 are spaced apart to admit an end of the door assembly 178 or the locking pin mount 248.

The second arms 284 have the same structure and function as the first arms 164 and extend outwardly from the second side 148 of the horizontal portion 122 beginning at a proximal end and terminating at a distal end. Each arm 284 defines a hole 289, a receiving member 294, and a seat 293. The hole 289 extends between the sides 286 of the arm 284 and is located adjacent the distal end of the arm 284. The receiving member 294 is disposed on the top 285 of the arm 284 and includes a depression 296 to accommodate the pin 204 of the engagement member 198, discussed in more detail below. Alternatively, the receiving member 294 may be a protrusion extending from the top 285 of the arm 284. The seat 293 is disposed on the bottom 287 distal end of the arm 284 to accommodate the lock pin 274, discussed in more detail below. The second arms 284 are spaced apart to admit an end of the door assembly 178 or the locking pin mount 248.

Referring to the figures, an embodiment of attaching the door assembly 178 to the horizontal portion 122 is shown and described where the catch assembly 160 is shown in use with the first arms 164, and the latch assembly 240 is shown in use with the second arms 284. The body 180 includes a first arm 184 extending from a first end 182, and second arms 236 extending from a second end 234.

The first arm 184 extends outward and away from the body 180 and defines an oblong opening 186 for admitting a pin 171 having a cross-sectional dimension, preferably a circular cross-sectional dimension. The pin 171 rotatably retains the door assembly 178 to the horizontal portion 122 with the ends of the pin 171 secured within the holes 169. Alternatively, the pin 171 may be held in place within the arms by a pin 172 and removable from the holes 169. The oblong opening 186 includes internal sidewalls 187, and has a width in a first direction dimensioned to admit the pin 171 with minimal movement of the pin 171 between the sidewalls 187 in the first direction. The opening 186 is elongated in a second direction whereby the second direction is perpendicular to the first direction, preferably the second direction is parallel to a plane extending outward from the flange 106 when the door assembly 178 is in the closed position thereby allowing the pin 171 to move within the opening 186 between the side walls 187 in the second direction.

Figure 9:
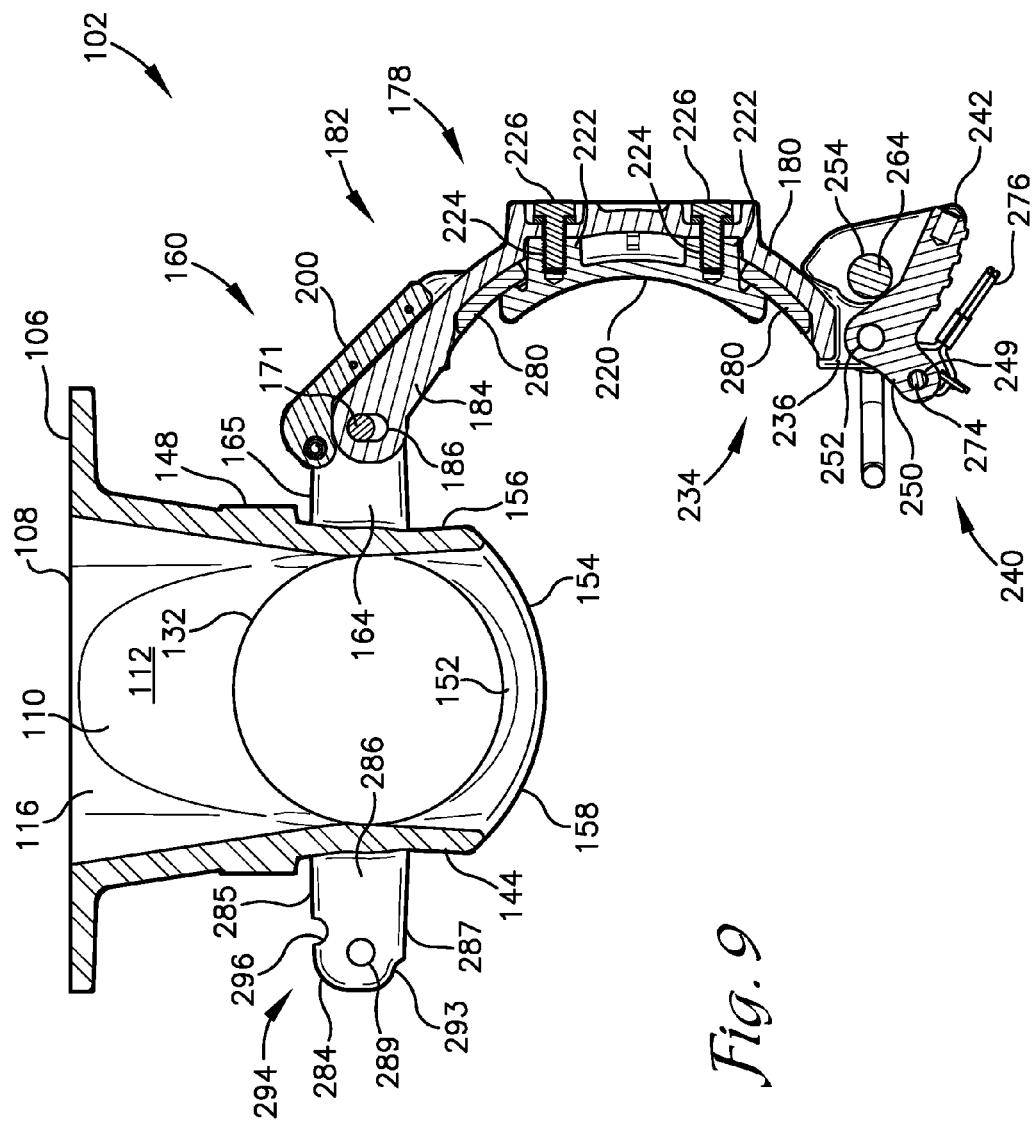
FIG. 9 is a cross-sectional view of the catch assembly in the engaged position.
Figure 10:
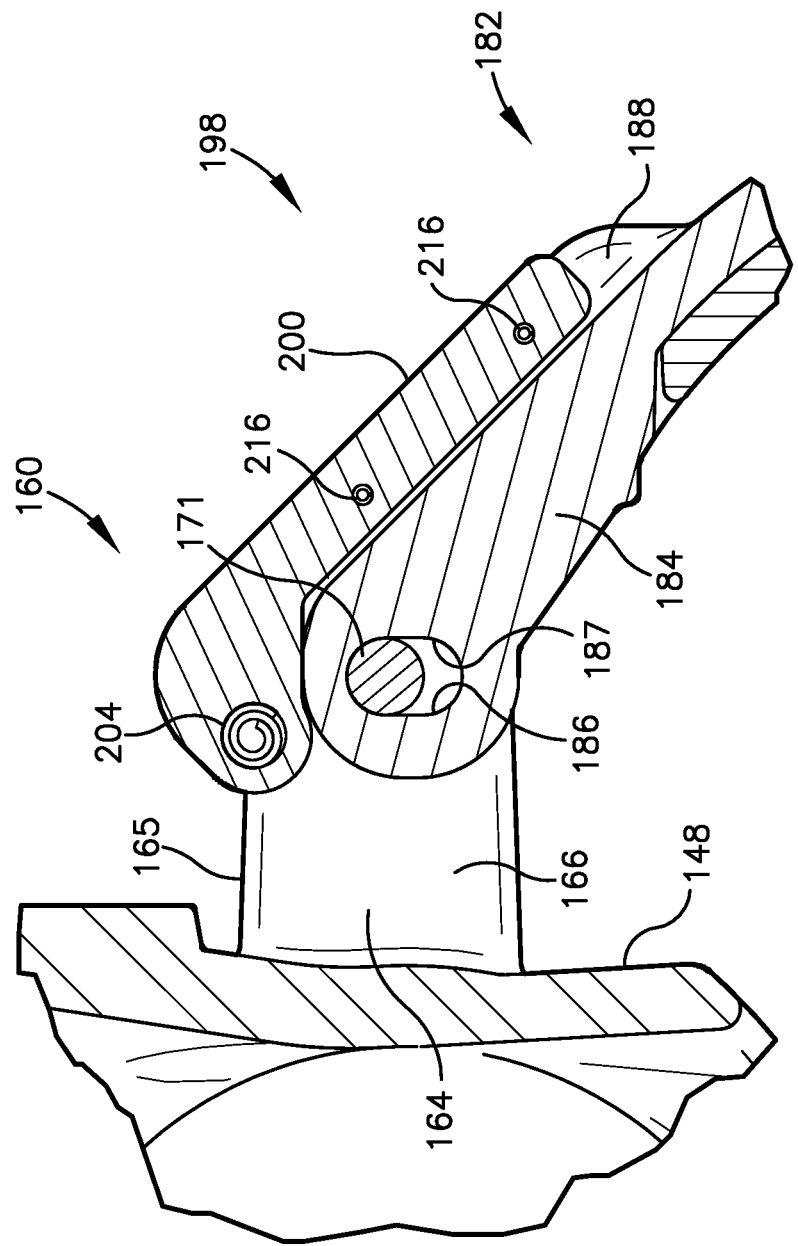
FIG. 10 is an enlarged cross-sectional view of the catch assembly as shown in FIG. 9.
Figure 11:
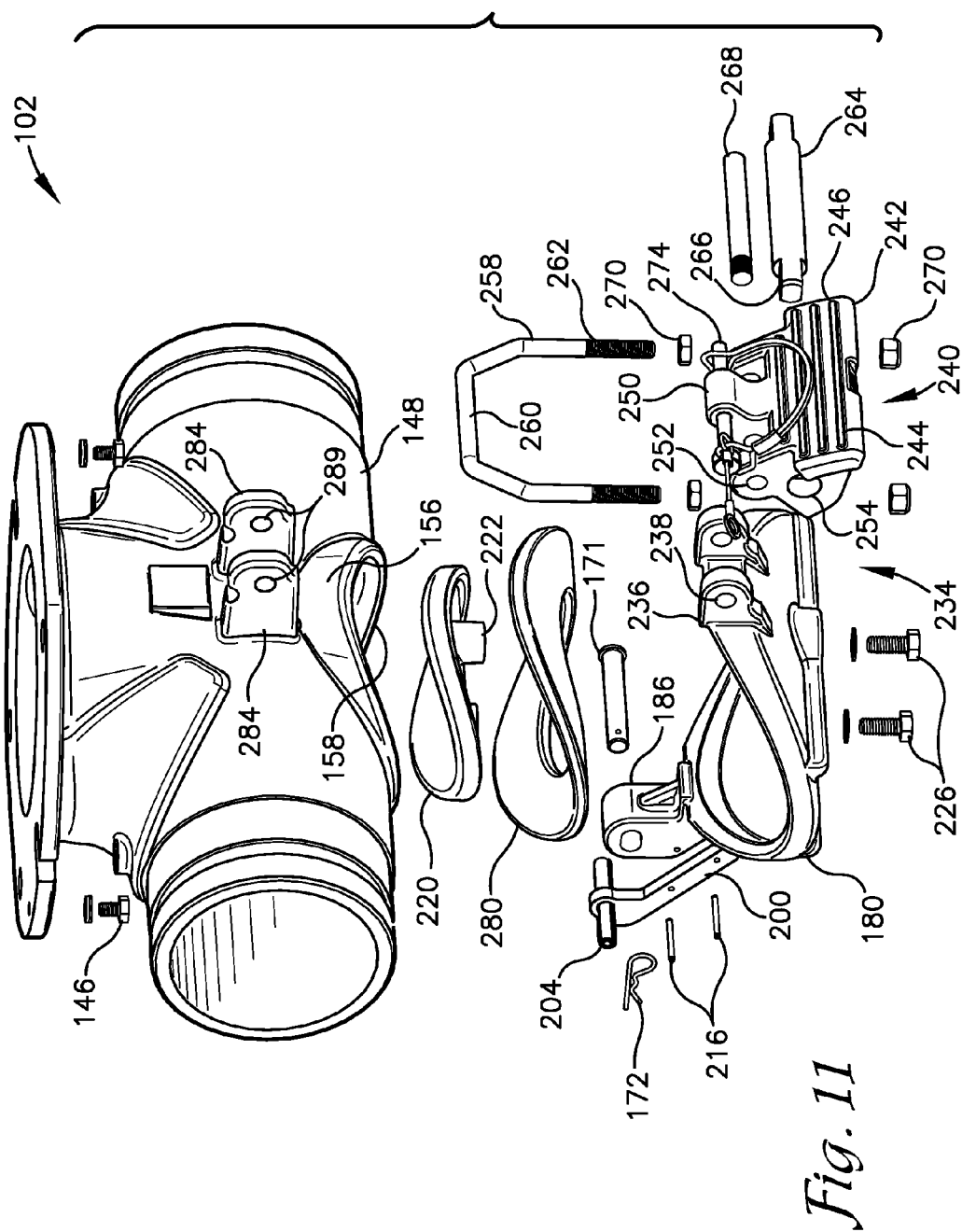
FIG. 11 is an exploded view of the hopper tee with a catch assembly.

An engagement member 198 adjacent the distal end of the first arm 184 engages the receiving member 174 when the door assembly 178 is rotated from a closed position (FIGS. 1-7) to an open position (FIGS. 8-10). The engagement member 198 includes a pin 204 that is either integrally molded with the first arm 184, or is disposed within a mount 200, preferably the pin 204 is disposed within a mount 200. In an embodiment, the mount 200 includes a head at a first end defining a hole 202 with a body extending therefrom to a second end. The hole 202 retains the pin 204, and the pin 204 may be threadably received within the hole 202. Preferably the pin 204 is press fit within the hole 202, or the pin is securely received within the hole 202, including a roll pin. The hole 202 is disposed adjacent the end of the first arm 184, and the body of the mount 200 is secured within a channel 188 disposed within the bottom side of the first arm 184 by a pair of fasteners including pins 216.

A wear plate 220 is disposed generally between the first end 182 and second end 234 of the body 180 at the interior surface of the body 180. The wear plate 220 is generally elliptical in shape corresponding to the dimension of the bottom opening 158, and conforming to the geometry of the bottom opening 158. The wear plate 220 retains the gasket 280 against the body 180 and is secured to the body 180 by threaded fasteners 226, including screws. A pair of feet 222 extend from the bottom of the wear plate 220 and include threaded apertures 224 for receiving the fasteners 226. A pair of corresponding apertures 230 passing through the wall of the body 180 allow the fasteners 226 to extend upward through the body 180 to secure the wear plate 220 thereto. A lip extending downward from the edge of the wear plate 220 aids in retaining the gasket 280 in the proper position. Ribs 228 at the exterior of the body 180 add structural support to the apertures 230 and to the body 180 as a whole.

The second arms 236 are parallel and extend outward and away from the body 180 with each defining an opening 238 for admitting a pin 268. The pin 268 rotatably retains a latch assembly 240 to the second end 234.

The latch assembly 240 generally includes a latch 242 with a main body 244 and a clasp 258. The main body 244 is generally rectangular and has a front face and a rear face. A locking pin mount 248 extends upward and away from the front face of the body 244 and includes an arm 250 defining a hole 249 at a distal end. A pair of arms 250 extend away from the rear face of the body 244 opposite the mount 248, with each arm 250 defining an upper hole 252 and an adjacent lower hole 254. Ears 246 extending laterally away from the main body 244 increase the surface area of the front face. The latch 242 is connected to the second end 234 by passing the second arms 236 of the door assembly 178 between the arms 250 of the latch assembly 240 and aligning the openings 238 with the upper holes 252. One or both ends of the pin 268 are press fit into the openings 238. The clasp 258 is rotatably mounted to the latch 242 by a latch pin 264. The clasp 258 includes a horizontal member 260 and two legs 262 depending therefrom having threaded ends. The latch pin 264 is rotatably received within the lower holes 254 whereby the apertures 266 are disposed adjacent the outside face of the arms 250. Each end of the pin 264 includes a transverse aperture 266 therethrough for retaining a leg 262. Opposing nuts 270 retain the clasp 258 on the pin 264 and allow for adjustment of the horizontal member 260 toward and away from the body 244 to adjust the sealing relationship between the door assembly 178 and the horizontal portion 122.

The arrangement of the upper holes 252 and the lower holes 254 of the latch assembly 240 provides and arrangement whereby engagement of the clasp 258 with the retaining member 294, and rotation of the body 244 beneath the second arms 284, causes the door assembly 178 to move into a closed position compressing the gasket 280 against the bottom opening 158 sealing the bottom of the hopper tee 102. A lock pin 274 can be inserted into the hole 249 in the locking pin mount 248 when the door assembly 178 is in the closed position to secure the door assembly 178 in the closed position. When the lock pin 274 is engaged within the hole 249, the arrangement of the upper holes 252 and the hole 249 in the locking pin mount 248 cause the ends of the lock pin 274 to bias against the seats 293 on the bottom 287 of the second arms 284 were the latch 242 rotated outward from beneath the second arms 236.

The door assembly 178 is transitioned between the closed position and the open position by first removing the lock pin 274. A deformable U-shaped retainer 276 prevents the lock pin 274 from sliding out of the hole 249. A first end of the retainer 276 extends around a first end of the lock pin 275, and a second end of the retainer passes through a hole in second end of the lock pin 275. The ends of the retainer 276 are moved away from each other to allow the lock in 275 to be removed from the holes 249. The latch 242 is then rotated outward from beneath the second arms 236 by engaging the rear surface of the body 244 with either a hand, foot, or object and applying force away from the hopper tee 102. The arm 250 passes between the second arms 236 as the body 244 rotates about the pin 268, and the latch pin 264 rotates within the lower hole 254 outward from beneath the second arms 236. Transitioning the lower hole 254 from below the upper hole 252 to a position adjacent or above the upper hole 252 causes the gasket 280 to unseat from the lip 156. Thus the door assembly 178 will be in a partially open position, and the second end 234 of the body 180 will be suspended below the horizontal portion 122 by the horizontal member 260 engaging the receiving member 294. After disengaging the clasp 258 from the receiving member 294, the mass of the door assembly 178 will cause it to move downward and away from the bottom of the horizontal portion 122 as it pivots about the pin 171. As the door assembly 178 rotates, the pin 204 of the engagement member 198 rotates with the door assembly 178 around the pin 171 until the door assembly 178 slides downward along the pin 171 due to the travel of the pin 171 within the oblong opening 186, and thereby cause the pin 204 to make contact with the receiving member 174. Alternatively, the door assembly 178 can be rotated down and away from the bottom of the hopper tee 102 in a controlled manner until the assembly slides downward along the pin 171 causing the pin 204 to make contact with the receiving member 174. Once the pin 204 seats against the receiving member 174 the door assembly 178 remains in the open position and material can be discharged from the container above the hopper tee 102 directly through the hopper tee 102 and out the bottom opening 158 in the bottom of the horizontal portion 122.

Once unloading of the container or cleaning of the hopper tee 102 is complete, the door assembly 178 is transitioned between the open position and the closed position by first moving the door assembly 178 upward so that the assembly slides upward along the pin 171 disengaging the pin 204 from the receiving member 174. The latch assembly is then moved toward the second arms 236 and the horizontal member 260 of the clasp 258 is seated against the receiving member 294. Force is applied against the front face of the body 244 causing the body 244 to rotate beneath the first arms 164 and the gasket 280 to seal against the bottom opening 158 thereby securing the door assembly 178 to the horizontal portion 122 in a closed position.

It will be appreciated that the catch assembly 160 may be used with various types of conduits, or with various types of doors. Moreover, the hopper tee 102 and its components can be fabricated in various sizes and from a wide range of suitable materials, using various manufacturing and fabrication techniques.

Although the subject matter has been disclosed with reference to various particular embodiments, it is understood that equivalents may be employed and substitutions made herein without departing from the scope of the invention as recited in the claims.

Having thus described the disclosed subject matter, what is claimed as new and desired to be secured by Letters Patent is:

1. A hopper tee for transferring material from a container, comprising:
    a vertical tubular portion extending between an upper end having an upper opening, and a lower end having a lower opening, the vertical portion defining a vertical passage for transferring material from the container through the tee;
    a horizontal tubular portion extending between a first end having a first opening, and a second end having a second opening, the horizontal tubular portion including a wall extending between an inner surface and an outer surface defining a horizontal passage;
    wherein the vertical passage intersects the horizontal passage for transferring material from the container through the tee;
    a bottom opening extending through the bottom of the horizontal tubular portion wall;
    a door for sealing the bottom opening of the horizontal tubular portion;
    a mechanism for securing the door to the horizontal tubular portion, comprising:
        a first mount connected to the horizontal tubular portion, comprising:
            an arm having a top edge, an opposite bottom edge, and sidewalls therebetween, wherein the arm defines a hole between the sidewalls; and
            a receiving member adjacent the hole at a top edge of the arm;
        an engagement member connected to the door, comprising:
            a first arm defining an oblong hole with sidewalls therethrough, the oblong hole having a first width and an elongated second width; and
            an engagement pin connected to the first arm for engaging the receiving member;
        a pivot pin admitted within the mount arm hole and the engagement member first arm hole;
        wherein the engagement member rotates about the pivot pin; and
        wherein the pivot pin moves between the sidewalls along the length of the second width when the engagement pin is aligned to engage the receiving member.

2. The mechanism of claim 1, wherein the receiving member is a depression within the top edge of the first mount arm.

3. The mechanism of claim 1, wherein the door further comprises:
    a wear plate releasably connected to the door and dimensioned to be received within the opening; and
    a seal disposed between the door and the horizontal tubular portion whereby the seal is compressed against the opening when the door is in a closed position.

4. The mechanism of claim 1, further comprising:
    a second mount connected to the horizontal tubular portion opposite the first mount, comprising:
        an arm having a top edge, an opposite bottom edge, and sidewalls therebetween, wherein the arm defines a hole between the sidewalls; and
        a receiving member adjacent the hole at a top edge of the arm;
    wherein the door further comprises a second arm opposite the first arm; and
    a latch assembly rotatably mounted to the door second arm for engaging the second mount.

5. The mechanism of claim 4, wherein the latch assembly further comprises:
    a latch, comprising:
        a body;
        a pair of adjacent arms extending away from the body, each arm defining an upper hole and an adjacent lower hole; and
        a mount extending away from the body opposite the arms, the mount defining a hole at a distal end;
    a latch pin rotatably received within the lower hole;
    wherein the body is rotatably mounted about the door second arm by a pin received within the upper hole; and
    a clasp connected to the latch pin at a first end and adapted for engaging the receiving member of the second mount.

6. The mechanism of claim 5, wherein the latch assembly further comprises a lock pin removably received within the mount hole.

7. A hopper tee for transferring material from a container, comprising:
   a vertical tubular portion extending between an upper end having an upper opening, and a lower end having a lower opening, the vertical portion defining a vertical passage for transferring material from the container through the tee;
   a horizontal tubular portion extending between a first end having a first opening, and a second end having a second opening, the horizontal tubular portion including a wall extending between an inner surface and an outer surface defining a horizontal passage;
   wherein the vertical passage intersects the horizontal passage for transferring material from the container through the tee;
   a bottom opening extending through the bottom of the horizontal tubular portion wall;
   a door for sealing the bottom opening of the horizontal tubular portion, comprising:
      a body having an interior surface; and
      an aperture within the body for receiving a threaded fastener;
   a wear plate releasably connected to the interior of the door and dimensioned to be received within the opening;
   a foot extending from the wear plate, the foot including a threaded aperture for securing the wear plate to the door by the threaded fastener;
   a mechanism for securing the door to the horizontal tubular portion, comprising:
      a first mount connected to the horizontal tubular portion, comprising:
         an arm having a top edge, an opposite bottom edge, and sidewalls therebetween, wherein the arm defines a hole between the sidewalls; and
         a receiving member adjacent the hole at a top edge of the arm;
      an engagement member connected to the door, comprising:
         a first arm defining an oblong hole with sidewalls therethrough, the oblong hole having a first width and an elongated second width; and
         an engagement pin connected to the first arm for engaging the receiving member;
         a pivot pin admitted within the mount arm hole and the engagement member first arm hole;
         wherein the engagement member rotates about the pivot pin; and
         wherein the pivot pin moves between the sidewalls along the length of the second width when the engagement pin is aligned to engage the receiving member.

8. The hopper tee of claim 7, further comprising:
   a second mount connected the horizontal tubular portion opposite the first mount, comprising:
      an arm having a top edge, an opposite bottom edge, and sidewalls therebetween, wherein the arm defines a hole between the sidewalls; and
      a receiving member adjacent the hole at a top edge of the arm;
   wherein the door further comprises a second arm opposite the first arm, the second arm defining a hole; and
   a latch assembly rotatably mounted to the door second arm for engaging the second mount, comprising:
      a body;
      a pair of adjacent arms extending away from the body, each arm defining an upper hole and an adjacent lower hole;
      a mount extending away from the body opposite the arms, the mount defining a hole at a distal end;
      a latch pin rotatably received within the lower hole;
      wherein the body is rotatably mounted about the door second arm by a pin received within the upper hole and the second arm hole; and
      a clasp connected to the latch pin at a first end and adapted for engaging the receiving member of the second mount.

9. The hopper tee of claim 7, further comprising:
   a gasket for sealing the door against the bottom opening of the horizontal tubular portion.

10. The hopper tee of claim 9, wherein the gasket is retained between the wear plate and the door.

11. The hopper tee of claim 9, further comprising a lip extending downward from the edge of the wear plate for retaining the gasket against the door.

* * * * *